(12) United States Patent
Kazmi et al.

(10) Patent No.: US 10,333,660 B2
(45) Date of Patent: Jun. 25, 2019

(54) DETERMINING A RATE AT WHICH UNITS OF DATA ARE RECEIVED ERRONEOUSLY

(71) Applicant: Telefonaktiebolaget LM Ericsson (publ), Stockholm (SE)

(72) Inventors: Muhammad Kazmi, Bromma (SE); Iana Siomina, Täby (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 15/304,930

(22) PCT Filed: May 11, 2015

(86) PCT No.: PCT/SE2015/050522
§ 371 (c)(1),
(2) Date: Oct. 18, 2016

(87) PCT Pub. No.: WO2015/171070
PCT Pub. Date: Nov. 12, 2015

(65) Prior Publication Data
US 2017/0177430 A1 Jun. 22, 2017

Related U.S. Application Data

(60) Provisional application No. 61/991,673, filed on May 12, 2014, provisional application No. 61/990,855, filed on May 9, 2014.

(51) Int. Cl.
*H04L 1/20* (2006.01)
*H04L 1/00* (2006.01)
*G06F 11/07* (2006.01)

(52) U.S. Cl.
CPC ............ *H04L 1/203* (2013.01); *G06F 11/076* (2013.01); *G06F 11/0709* (2013.01);
(Continued)

(58) Field of Classification Search
CPC .... H04L 1/203; H04L 1/0026; G06F 11/0709; G06F 11/076
See application file for complete search history.

(56) References Cited

U.S. PATENT DOCUMENTS 3,934,224 A * 1/1976 Dulaney ............... H04L 1/14
375/227
5,138,616 A * 8/1992 Wagner, Jr. ......... G06F 11/076
714/704
(Continued)

OTHER PUBLICATIONS

Ericsson, "eMBMS reporting", Change Request for TS 36.133, 3GPP TSG-RAN WG4 Meeting #71, Seoul, South Korea, May 12, 2014, pp. 1-2, R4-143795, 3GPP.
(Continued)

*Primary Examiner* — Joseph D Torres
(74) *Attorney, Agent, or Firm* — Sage Patent Group

(57) ABSTRACT

A method is implemented by a first radio node (30) for determining a rate at which units of data are received erroneously from one or more second radio nodes. The method comprises inspecting (110) data units received from the one or more second radio nodes for errors. The method also includes making (120) successive determinations of the rate at which data units are received erroneously from the one or more second radio nodes. Each determination must be made based on inspecting at least a minimum number of received data units for errors. The method further entails adapting (130) the minimum number of data units that must be inspected across determinations of different rates, such that determinations of different rates must be respectively made based on inspecting different minimum numbers of received data units for errors.

17 Claims, 12 Drawing Sheets

(52) U.S. Cl.
CPC ........ *G06F 11/0793* (2013.01); *H04L 1/0021* (2013.01); *H04L 1/0026* (2013.01); *H04L 1/0002* (2013.01); *H04L 1/0009* (2013.01)

(56) References Cited

U.S. PATENT DOCUMENTS

| | | | |
|---|---|---|---|
| 5,764,651 A | 6/1998 | Bullock et al. | |
| 5,802,039 A * | 9/1998 | Obayashi | H04L 7/10 370/216 |
| 5,937,005 A | 8/1999 | Obuchi et al. | |
| 6,920,591 B2 * | 7/2005 | Bauman | H04L 1/244 714/704 |
| 7,107,013 B2 * | 9/2006 | Qiu | H04L 1/0003 455/67.11 |
| 7,107,498 B1 * | 9/2006 | Schmidt | H04L 1/0026 714/704 |
| 8,121,046 B2 * | 2/2012 | Morrison | H04L 1/203 370/252 |
| 9,065,594 B1 | 6/2015 | Husted et al. | |
| 9,300,431 B2 * | 3/2016 | Hosangadi | H04L 1/0005 |
| 9,628,154 B2 * | 4/2017 | Bai | H04B 7/0413 |
| 2002/0081977 A1 | 6/2002 | McCune, Jr. | |
| 2004/0116142 A1 * | 6/2004 | Wang | H03M 13/091 455/522 |
| 2006/0183498 A1 * | 8/2006 | Lee | H04W 36/0072 455/552.1 |
| 2009/0185530 A1 | 7/2009 | Sternberg et al. | |
| 2010/0042876 A1 * | 2/2010 | Yue | H04L 1/0003 714/704 |
| 2010/0058132 A1 | 3/2010 | Kumar | |
| 2010/0254471 A1 * | 10/2010 | Ko | H04L 5/0023 375/260 |
| 2012/0287838 A1 * | 11/2012 | Zhang | H04W 72/005 370/312 |
| 2013/0156118 A1 | 6/2013 | Dick | |
| 2014/0241182 A1 | 8/2014 | Smadi | |

OTHER PUBLICATIONS

Ericsson, "eMBMS measurement requirements", 3GPP TSG-RAN WG4 Meeting #71, Seoul, South Korea, May 19, 2014, pp. 1-2, R4-143794, 3GPP.

* cited by examiner

| ID | $N_{min}$ subframes | MCH BLER |
|---|---|---|
| 0 | 100 | 0.5 |
| 1 | 150 | 0.2 |
| 2 | 275 | 0.1 |
| 3 | 1500 | 0.01 |
| 4 | 3000 | 0.001 |
| 5 | 20000 | 0.0001 |

FIGURE 4

| ID | K | R (%) | R | N = K/R | Nmin=Ceil(N) |
|---|---|---|---|---|---|
| 1 | 10 | 100 | 1 | 10 | 10 |
| 2 | 10 | 90 | 0.9 | 11.11111 | 12 |
| 3 | 10 | 80 | 0.8 | 12.5 | 14 |
| 4 | 10 | 70 | 0.7 | 14.28571 | 15 |
| 5 | 10 | 60 | 0.6 | 16.66667 | 17 |
| 6 | 10 | 50 | 0.5 | 20 | 20 |
| 7 | 10 | 40.645 | 0.40645 | 24.60327 | 25 |
| 8 | 10 | 33.04 | 0.3304 | 30.26634 | 31 |
| 9 | 10 | 26.858 | 0.26858 | 37.23285 | 38 |
| 10 | 10 | 21.833 | 0.21833 | 45.80223 | 46 |
| 11 | 10 | 17.748 | 0.17748 | 56.34438 | 57 |
| 12 | 10 | 14.427 | 0.14427 | 69.31448 | 70 |
| 13 | 10 | 11.728 | 0.11728 | 85.26603 | 86 |
| 14 | 10 | 9.533 | 0.09533 | 104.8988 | 105 |
| 15 | 10 | 7.75 | 0.0775 | 129.0323 | 130 |
| 16 | 10 | 6.3 | 0.063 | 158.7302 | 159 |
| 17 | 10 | 5.121 | 0.05121 | 195.2744 | 196 |
| 18 | 10 | 4.163 | 0.04163 | 240.2114 | 241 |
| 19 | 10 | 3.384 | 0.03384 | 295.5083 | 296 |
| 20 | 10 | 2.751 | 0.02751 | 363.5042 | 364 |
| 21 | 10 | 2.236 | 0.02236 | 447.2272 | 448 |
| 22 | 10 | 1.818 | 0.01818 | 550.055 | 551 |
| 23 | 10 | 1.478 | 0.01478 | 676.59 | 677 |
| 24 | 10 | 1.201 | 0.01201 | 832.6395 | 833 |
| 25 | 10 | 0.976 | 0.00976 | 1024.59 | 1025 |
| 26 | 10 | 0.794 | 0.00794 | 1259.446 | 1260 |
| 27 | 10 | 0.645 | 0.00645 | 1550.388 | 1551 |
| 28 | 10 | 0.524 | 0.00524 | 1908.397 | 1909 |
| 29 | 10 | 0.426 | 0.00426 | 2347.418 | 2348 |
| 30 | 10 | 0.347 | 0.00347 | 2881.844 | 2882 |
| 31 | 10 | 0.282 | 0.00282 | 3546.099 | 3547 |
| 32 | 10 | 0.229 | 0.00229 | 4366.812 | 4367 |
| 33 | 10 | 0.186 | 0.00186 | 5376.344 | 5377 |
| 34 | 10 | 0.151 | 0.00151 | 6622.517 | 6623 |
| 35 | 10 | 0.123 | 0.00123 | 8130.081 | 8131 |
| 36 | 10 | 0.1 | 0.001 | 10000 | 10000 |
| 37 | 10 | 0.01 | 0.0001 | 100000 | 100000 |

FIGURE 5

| ID | K | R (%) | R | N = K/R | Nmin=Ceil (N) |
|---|---|---|---|---|---|
| 1 | 100 | 100 | 1 | 100 | 100 |
| 2 | 90 | 90 | 0.9 | 100 | 100 |
| 3 | 80 | 80 | 0.8 | 100 | 100 |
| 4 | 70 | 70 | 0.7 | 100 | 100 |
| 5 | 60 | 60 | 0.6 | 100 | 100 |
| 6 | 50 | 50 | 0.5 | 100 | 100 |
| 7 | 45 | 40.645 | 0.40645 | 110.7147 | 111 |
| 8 | 40 | 33.04 | 0.3304 | 121.0654 | 122 |
| 9 | 35 | 26.858 | 0.26858 | 130.315 | 131 |
| 10 | 30 | 21.833 | 0.21833 | 137.4067 | 138 |
| 11 | 29 | 17.748 | 0.17748 | 163.3987 | 164 |
| 12 | 28 | 14.427 | 0.14427 | 194.0805 | 195 |
| 13 | 27 | 11.728 | 0.11728 | 230.2183 | 231 |
| 14 | 26 | 9.533 | 0.09533 | 272.7368 | 273 |
| 15 | 25 | 7.75 | 0.0775 | 322.5806 | 323 |
| 16 | 24 | 6.3 | 0.063 | 380.9524 | 381 |
| 17 | 23 | 5.121 | 0.05121 | 449.131 | 450 |
| 18 | 22 | 4.163 | 0.04163 | 528.465 | 529 |
| 19 | 21 | 3.384 | 0.03384 | 620.5674 | 621 |
| 20 | 20 | 2.751 | 0.02751 | 727.0084 | 728 |
| 21 | 19 | 2.236 | 0.02236 | 849.7317 | 850 |
| 22 | 18 | 1.818 | 0.01818 | 990.099 | 991 |
| 23 | 17 | 1.478 | 0.01478 | 1150.203 | 1151 |
| 24 | 16 | 1.201 | 0.01201 | 1332.223 | 1333 |
| 25 | 15 | 0.976 | 0.00976 | 1536.885 | 1537 |
| 26 | 14 | 0.794 | 0.00794 | 1763.224 | 1764 |
| 27 | 13 | 0.645 | 0.00645 | 2015.504 | 2016 |
| 28 | 12 | 0.524 | 0.00524 | 2290.076 | 2291 |
| 29 | 11 | 0.426 | 0.00426 | 2582.16 | 2583 |
| 30 | 10 | 0.347 | 0.00347 | 2881.844 | 2882 |
| 31 | 9 | 0.282 | 0.00282 | 3191.489 | 3192 |
| 32 | 8 | 0.229 | 0.00229 | 3493.45 | 3494 |
| 33 | 7 | 0.186 | 0.00186 | 3763.441 | 3764 |
| 34 | 5 | 0.151 | 0.00151 | 3311.258 | 3312 |
| 35 | 4 | 0.123 | 0.00123 | 3252.033 | 3253 |
| 36 | 3 | 0.1 | 0.001 | 3000 | 3000 |
| 37 | 2 | 0.01 | 0.0001 | 20000 | 20000 |

FIGURE 6

DETERMINING A RATE AT WHICH UNITS OF DATA ARE RECEIVED ERRONEOUSLY

RELATED APPLICATIONS

This application claims priority from U.S. Provisional Patent App. No. 61/991,673 filed 12 May 2014, and from U.S. Provisional Patent App. No. 61/990,855 filed 9 May 2014, both of which are incorporated herein by reference in their entirety.

TECHNICAL FIELD

The present application generally relates to error rate determination, and specifically relates to determining a rate at which units of data are received erroneously.

BACKGROUND

A radio node in a wireless communication system typically determines the rate at which it receives units of data erroneously from another radio node. Conventional approaches to determining this error rate involve identifying how may data units are received erroneously out of some total number of considered data units. This error rate can be used to improve transmission between the radio nodes.

Consider an example in the context of a Multimedia Broadcast Multicast Service (MBMS). MBMS is a broadcasting technique for E-UTRAN to optimize the downlink radio resource usage in scenarios where a large amount of users are interested in receiving the same content. A transport channel called the Multicast Channel (MCH) supports MBMS. A radio node typically determines a so-called MCH block error rate (BLER) as the rate at which it receives MCH transport blocks erroneously from another radio node. The node computes the MCH BLER over a measurement period as the ratio between the number of received MCH transport blocks resulting in a Cyclic Redundancy Check (CRC) error and the total number of MCH transport blocks received within the measurement period (at least those that use the same modulation and coding scheme).

In this context and others, known approaches statically fix the total number of data units that are considered for determining the error rate. This means that, as a radio node updates its error rate determination by making different determinations over time, the radio node makes those different error rate determinations based on inspecting the same number of received data units for errors.

SUMMARY

Embodiments herein recognize and address problems with existing approaches to error rate determination. Under certain scenarios, the existing approaches produce unreliable error rate determinations when those determinations are based on inspecting the same number of received data units for errors. For example, when error rate determinations vary between very small and very large values, e.g., 0.1% to 50%, those determinations are sub-optimal if they are based on inspecting the same number of data units for errors. That is, it is not optimal to conclude that the error rate (e.g., MCH BLER) has a small value based on performing error rate measurements over a number of data units (e.g., MCH transport blocks) that is substantially the same as the number of data units over which error rate measurements are performed for concluding that the error rate has a large value.

The unreliable error rate determination may adversely affect system performance and degrade user experience.

According to one or more embodiments herein, a radio node must inspect a different number of data units for errors in order to make determinations of different error rates. That is, the number of data units that must be inspected is adapted across determinations of different rates. This proves advantageous, for example, in yielding more reliable error rate determinations, irrespective of the error rate value, and improves system performance and user experience.

One embodiment, for example, includes a method implemented by a first radio node for determining a rate at which units of data are received erroneously from one or more second radio nodes. The method comprises inspecting data units received from the one or more second radio nodes for errors. The method also includes making successive determinations of the rate at which data units are received erroneously from the one or more second radio nodes. Each determination must be made based on inspecting at least a minimum number of received data units for errors. The method further entails adapting the minimum number of data units that must be inspected across determinations of different rates, such that determinations of different rates must be respectively made based on inspecting different minimum numbers of received data units for errors.

In some embodiments, making any given one of the determinations comprises, for each of one or more iterations: (i) making a tentative determination of the rate based on inspecting a provisional number of received data units for errors; and (ii) identifying a minimum number of received data units that must be inspected in order to make the tentative determination final, based on a function which defines, for each of multiple different possible rates, a minimum number of received data units that must be inspected in order to make a determination of that rate final. If the provisional number is greater than or equal to the identified number, the method designates the tentative determination as final. But if the provisional number is less than the identified number, the method inspects additional received data units for errors as a basis for making another tentative determination in another iteration.

Additionally or alternatively, the method further comprises receiving signaling from another node indicating different minimum numbers of received data units that the first radio node must inspect as a basis for making determinations of different rates at which data units are received erroneously.

Embodiments herein also correspondingly include a method implemented by a node for configuring a first radio node to make successive determinations of a rate at which units of data are received erroneously from one or more second radio nodes. The method comprises generating signaling that configures the first radio node to adapt a minimum number of data units that the first radio node must inspect across determinations of different rates, such that determinations of different rates must be respectively based on inspecting different minimum numbers of received data units for errors. The method then comprises sending the generated signaling to the first radio node.

In some embodiments, this signaling indicates different minimum numbers of received data units that the first radio node must inspect as a basis for making determinations of different rates at which data units are received erroneously. Alternatively, the signaling identifies which of multiple possible functions the first radio node is to use to determine the minimum number of received data units that must be inspected as a basis for making a determination that data units are received erroneously at a particular rate. In still other embodiments, the signaling comprises a first parameter, wherein the minimum number of received data units that must be inspected as a basis for making a determination that data units are received erroneously at a particular rate is a function of at least said first parameter.

In any of these first radio node or signaling node embodiments, though, the method may further comprise determining the minimum number of received data units that must be inspected as a basis for making a determination that data units are received erroneously at a particular rate, as a function of at least a first parameter. This first parameter may be rate-agnostic such that the first parameter has the same value for said different rates. Alternatively, the first parameter may be rate-specific such the first parameter has different values for at least some different rates.

In any case, though, the first parameter in some embodiments is a function of one or more of: (i) a range of possible values for said rate; (ii) a level of reliability with which said rate must be determined; (iii) a rate at which the one or more second radio nodes transmit data units to the first radio node; and (iv) a level of urgency for determinations of said rate.

In some embodiments, determining said minimum number comprises calculating a second parameter as being the first parameter divided by said particular rate, and calculating the minimum number as being the smallest integer number not less than the second parameter.

Regardless, any of the methods herein may further comprises determining the minimum number of received data units that must be inspected as a basis for making a determination that data units are received erroneously at a particular rate, as a function of at least one or more of: (i) an accuracy or uncertainty with which the first radio node makes determinations of the rate at which data units are received erroneously; and (ii) a scaling or shaping parameter for scaling or shaping an intermediate derivation of said minimum number.

Alternatively or additionally, in some embodiments determinations of relatively smaller rates must be respectively made based on inspecting relatively greater numbers of received data units for errors.

Still further, the determinations in one or more embodiments comprise selections from a set of predefined rates. In this case, selections of different predefined rates must be made based on inspecting different minimum numbers of received data units for errors.

In some embodiments, the methods herein further comprise determining the minimum number of received data units that must be inspected as a basis for making a determination that data units are received erroneously at a particular rate, as a function of at least that particular rate and/or a type of service associated with that particular rate.

Alternatively or additionally, the methods herein further comprise performing one or more radio operational tasks using one or more of the error rate determinations. These one or more radio operational tasks include one or more of: (i) adapting one or more parameters that govern reception of data units by the first radio node and/or that govern transmission of data units by the second radio node; (ii) reporting one or more of the error rate determinations to another node; (iii) recommending a transport format to be used by the second radio node for transmitting data units to the first radio node; (iv) configuring whether or not the first radio node provides feedback to the second radio node; and (v) configuring a scheme with which the first radio node detects and/or corrects errors in received data units.

In one or more of these embodiments, the first radio node is a user equipment, UE, said data units are Multicast Channel, MCH, transport blocks that contain MCH data for a Multimedia Broadcast Multicast Service, MBMS, and said rate is a block error rate. In this case, the method may further comprise configuring Multimedia Broadcast Multicast Service, MBMS, service areas and/or tuning MBMS-related transmission or reception parameters based on said determinations.

Embodiments herein also include a first radio node configured to determine a rate at which units of data are received erroneously from one or more second radio nodes. Embodiments further include a node for configuring the first radio node to make successive determinations of a rate at which units of data are received erroneously from one or more second radio nodes.

Finally, embodiments include a computer program comprising instructions which, when executed by at least one processor of a node, causes the node to carry out any of the methods herein. And embodiments include a carrier containing this computer program, wherein the carrier is one of an electronic signal, optical signal, radio signal, or computer readable storage medium.

BRIEF DESCRIPTION OF THE DRAWINGS

FIG. 4 is a table showing an example mapping between a minimum number of data units that must be inspected to make a determination of a particular error rate, according to one or more embodiments.

FIG. 5 is a table showing an example mapping between a minimum number of data units that must be inspected to make a determination of a particular error rate, according to one or more other embodiments.

FIG. 6 is a table showing an example mapping between a minimum number of data units that must be inspected to make a determination of a particular error rate, according to still one or more other embodiments.

DETAILED DESCRIPTION

Figure 1:
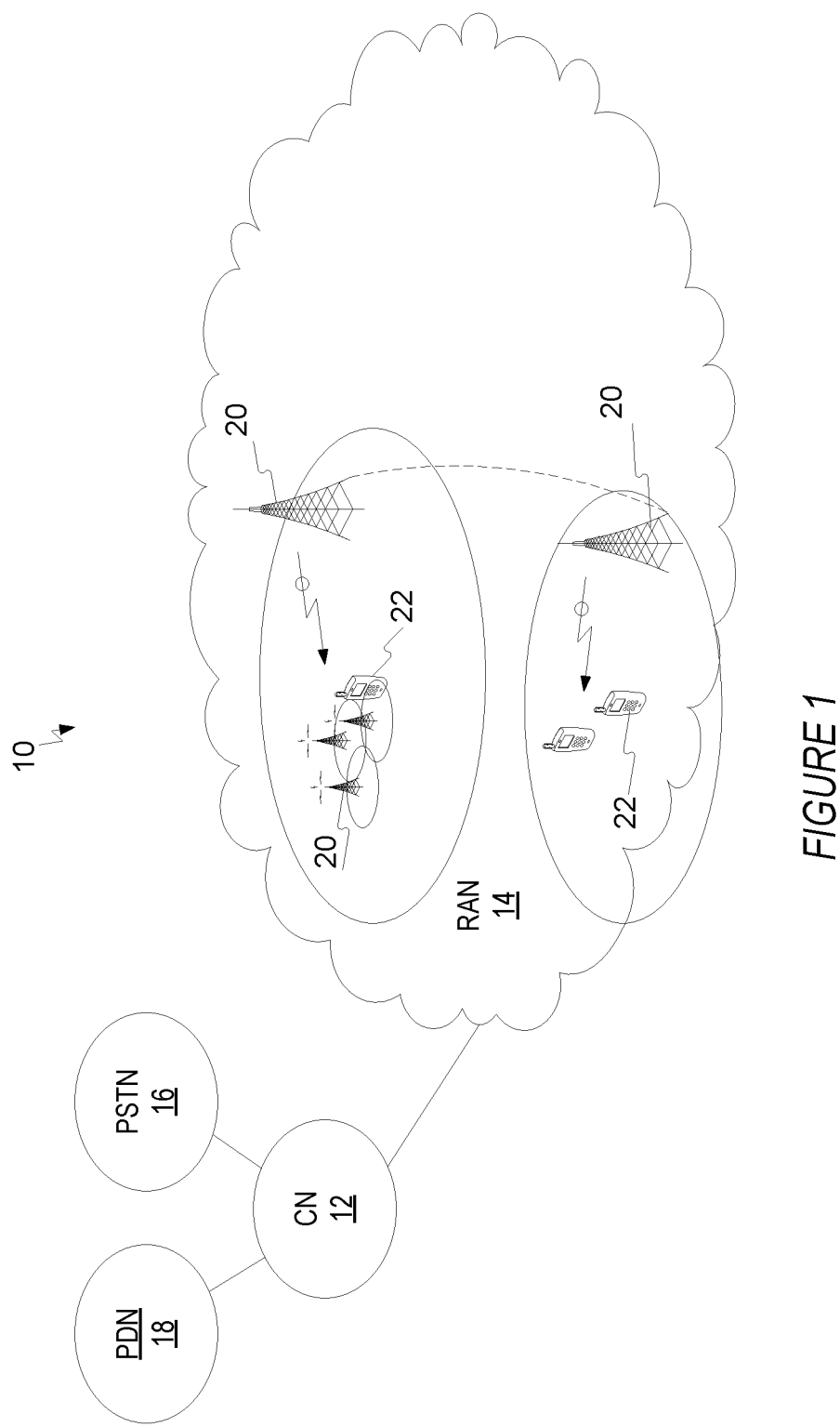
FIG. 1 is a block diagram of a wireless communication system according to one or more embodiments.

A radio node transmits and/or receives radio signals from a different radio node via one or more antennas. FIG. 1 illustrates an example of radio nodes in the context of a cellular communication system 10.

As shown, the system 10 includes a core network (CN) 12 and a radio access network (RAN) 14. The CN 12 connects wireless communication devices to one or more external networks via the RAN 14. The one or more external networks are shown as a public switched telephone network (PSTN) 16 and a packet data network (PDN) 18 such as the Internet.

The RAN 14 includes a plurality of radio access nodes 20, two of which are shown. Each radio access node 20 terminates one or more cells on which transmission are performed for communicating with wireless communication devices 22. A cell in this regard refers to a defined set of radio resources, such as a carrier frequency, for wirelessly communicating over a defined geographic region. For example, in embodiments where the wireless communication system 10 conforms to Long Term Evolution (LTE) specifications, the radio access nodes 20 comprise enhanced Node B's (eNodeB's) that each terminates one or more cells (also referred to as component carriers). Regardless, the RAN 14 may further include one or more repeaters, or one or more low-power radio access nodes 20.

Radio nodes in the system 10 include the wireless communication devices 22 and the radio access nodes 20. Any given one of these radio nodes may receive units of data from one or more other radio nodes, and determine the rate at which those units of data are received erroneously. A unit of data (or simply "data unit" for short) means any unit (whether physical, logical, time-based, etc.) that contains data and that is deemed erroneous or not as a whole. That is, reception errors are declared on a data unit by data unit basis (i.e., with a data unit granularity). For example, a data unit may be a packet, a packet entity, a transport block, a data block, a frame, a radio frame, or any such unit that contains data. Another example of a data unit is the number of TTI or interleaving time or any time duration (e.g. subframe, MBSFN subframe, slot, radio frame etc) over which the data unit can be fully received by the first radio node. Similarly, the error rate can be a data or transport BLER, a BLER, MCH BLER, FER, or simply an "error rate" or "data error rate".

Regardless, as one example, a wireless communication device 22 may determine the rate at which data units are received erroneously from one or more radio access nodes 20, or from one or more other wireless communication devices 22. Conversely, a radio access node 20 may determine the rate at which data units are received erroneously from one or more wireless communication devices 22, or from one or more other radio access nodes 22.

Figure 2:
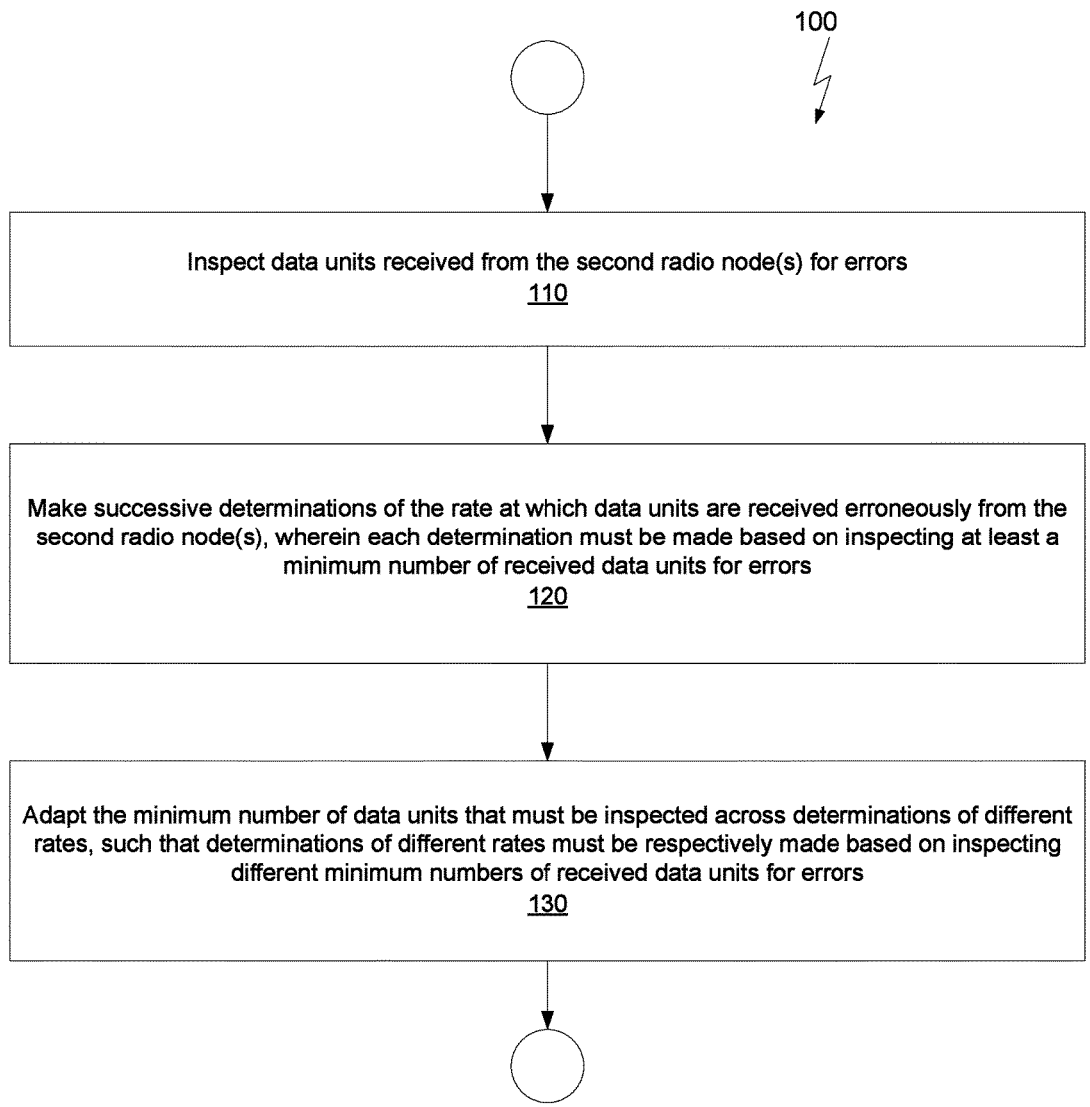
FIG. 2 is a logic flow diagram of a method implemented by a first radio node for determining a rate at which units of data are received erroneously from one or more second radio nodes, according to one or more embodiments.

Whether in the context of a cellular system 10 like that in FIG. 1 or in some other radio communication context, one or more embodiments herein concern techniques for a first radio node (e.g., node 20 or 22 in FIG. 1) to determine a rate at which units of data are received erroneously from one or more second radio nodes (e.g., node 20 or 22 in FIG. 1). FIG. 2 illustrates a method 100 performed by a first radio node in this regard according to some embodiments.

As shown in FIG. 2, the method comprises inspecting data units received from one or more second radio nodes for errors (e.g., by checking CRCs attached to or otherwise associated with the data units) (Block 110). The method also comprises making successive determinations of the rate at which data units are received erroneously from the one or more second radio nodes (Block 120). Each such determination is made based on inspecting at least a minimum number of received data units for errors (e.g., as or when those data units are received). Notably, the method also includes adapting the minimum number of data units that must be inspected across determinations of different rates (i.e., from determination to determination) (Block 130). According to this adaptation, determinations of different rates must be respectively made based on inspecting different minimum numbers of received data units for errors.

For example, the method may include making a first error rate determination by evaluating whether each of at least a first minimum number of data units received from the second radio node are erroneous. The method may then include making a second error rate determination by evaluating whether each of at least a second minimum number of data units received from the second radio node are erroneous. This second minimum number of data units is received after the first minimum number of data units. And the first and second minimum numbers are different, due to the above-described adapting. In other words, the method may involve inspecting successively received sets of data units for errors as a basis for making successive error rate determinations, where the minimum number of data units in those inspected sets may dynamically vary.

In at least some embodiments, adaptation is governed by a defined requirement that, in order to make a determination that the error rate has a particular value, that determination must be based on having inspected at least a certain number of received data units for errors. For example, in some embodiments, determinations of relatively higher rates must be respectively made based on inspecting relatively fewer numbers of received data units for errors, while determinations of relatively smaller rates must be respectively made based on inspecting relatively greater numbers of received data units for errors. According to these and other embodiments, adaptation is configured such that the reliability of the error rate determinations remains substantially uniform across the range of possible values for the error rate.

Although not shown, the method may further entail using one or more of the error rate determinations for one or more radio operational tasks. These tasks may include, for example, adapting one or more parameters that govern reception of data units by the first radio node (e.g., receiver parameters and/or selection). Alternatively or additionally, the tasks may include adapting one or more parameters that govern transmission of data units by the second radio node (e.g., transport format, transmit power, bandwidth, redundancy level). In other embodiments, the tasks include recommending a transport format to be used by the second radio node for transmitting the data units to the first radio node. In MBMS contexts, the tasks may include configuring MBMS service areas and/or tuning MBMS-related transmission or reception parameters. Regardless of the particular radio operational task(s), though, performing them based on the error rate determinations is advantageous because those underlying determinations prove more reliable than conventional error rate determinations.

Figure 3:
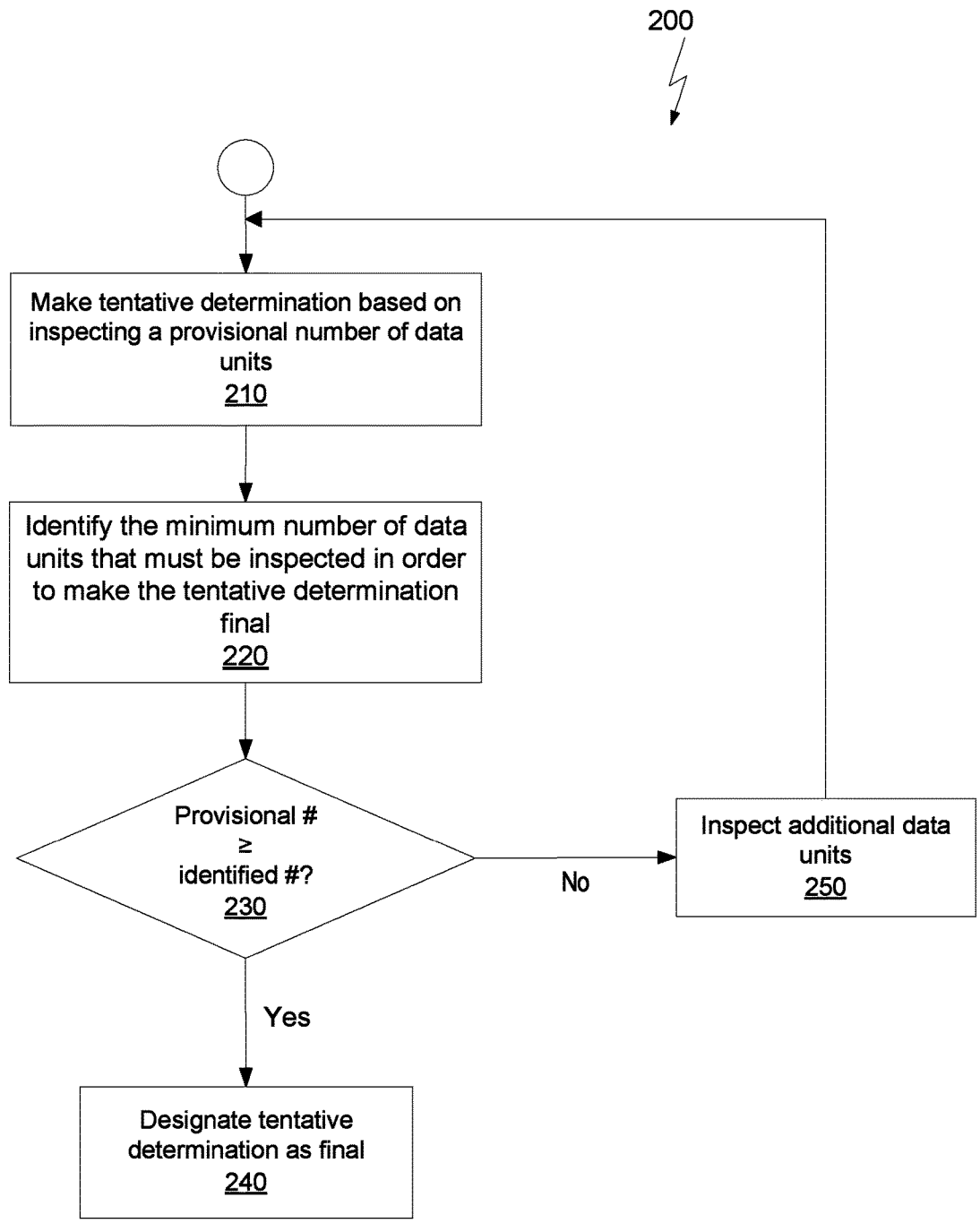
FIG. 3 is a logic flow diagram of an iterative approach to determining an error rate according to one or more embodiments.

In any event, adaptation of the minimum number of data units to inspect in one or more embodiments occurs dynamically as part of and during the course of making any given error rate determination. FIG. 3 shows an iterative adaptation process as one example in this regard. One "run" of the process entails performing one or more iterations as needed in order to make one "final" error rate determination. Further "runs" of the process are performed in order to make further "final" error rate determinations, such that successive runs of the process yield successive error rate determinations.

As shown in FIG. 3, making any given (final) determination entails one or more iterations. During a given iteration, the first radio node makes a tentative determination of the error rate based on inspecting a provisional number of received data units for errors (Block 210). Then, first radio node identifies the minimum number of received data units that must be inspected in order to make that tentative determination final (Block 220). In at least some embodiments, this identification is based on a function which defines, for each of multiple different possible rates, a minimum number of received data units that must be inspected in order to make a determination of that rate final. The function may specify, for example, how many received data units must be inspected (at a minimum) in order to make a determination of a particular rate (i.e., in order to determine that the error rate has a particular value), by mapping determinations of different rates to different minimum numbers of received data units that must be inspected (in order to make those respective determinations). Regardless, if the provisional number is greater than or equal to this identified number (i.e., if the tentative rate determination was made based on inspecting at least the number of data units required by the function) (Yes at Block 230), then the first radio node designates that tentative determination as final (i.e., as a non-tentative determination) (Block 240). On the other hand, if the provisional number is less than the identified number (i.e., if the tentative rate determination was made based on inspecting less than the number of data units required by the function) (No at Block 230), then the first radio node inspects additional data units for errors as a basis for making another tentative determination in another iteration (Block 250). The number of additional data units inspected in the next iteration can be fixed as a particular number (e.g., 1 or 5) so as not to vary from iteration to iteration, or can be variable depending on how many iterations have been performed. Regardless, in this way, the first radio node iteratively adapts the number of data units that it inspects in order to make an error rate determination, as a function of one or more tentative determinations of the value of the error rate.

In at least some embodiments, the first iteration in FIG. 3 involves inspecting a minimum number of data units that is defined as being required in order to make any error rate determination. That is, the first iteration's tentative error rate determination is whatever error rate results from inspecting this minimum number of data units. If this minimum number happens to be greater than or equal to the minimum number of data units that must be inspected in order to actually make the tentative determination final, then the first radio node does so. Otherwise, the first radio node performs one or more subsequent iterations (since additional data units must be inspected).

In some embodiments, the first radio node derives, calculates, or otherwise determines the minimum number of received data units that must be inspected as the basis for making any given error rate determination. In one or more embodiments, for example, the first radio node determines the minimum number of received data units that must be inspected as a basis for making a determination that data units are received erroneously at a particular rate, as a function of at least that particular rate, a type of service associated with that particular rate, and/or any other parameter tied to that particular rate.

Consider embodiments where any given error rate determination is made by selecting that rate from a set of predefined rates; that is, the values for error rate are constrained to those defined within a predefined set of values. In this case, the above-described adaptation entails adapting the minimum number of data units that must be inspected across determinations that select different ones of the predefined rates, such that determinations of different predefined rates must be made based on inspecting different minimum numbers of received data units.

In one embodiment, the first radio node derives or otherwise determines the minimum number of received data units that must be inspected as the basis for making any given determination, as a function of one or more predefined values that are possible for the error rate. In some embodiments, such as those illustrated in FIG. 3, this means that the function maps different predefined values that are possible for the error rate (also referred to as different predefined rates) to different minimum numbers of received data units that must be inspected (in order to make a determination that the error rate has that respective predefined value). For instance, predefined values that are relatively high require inspection of a fewer number of data units, while predefined values that are relatively low require inspection of a greater number of data units.

FIG. 4 shows an example in a context where the first radio node is a user equipment, UE, the data units are Multicast Channel, MCH, transport blocks that contain MCH data for a Multimedia Broadcast Multicast Service, MBMS, and where the error rate is a block error rate (MCH BLER). The table embodies a function that maps different predefined values for MCH BLER to different minimum numbers $N_{min}$ of MCH transport blocks or subframes (assuming that one subframe contains a single MCH transport block). The number $N_{min}$ is the minimum number of subframes that must be inspected for errors in order to make the corresponding BLER determinations. Following an example iterative process for FIG. 4, the first radio node in some embodiments performs a first iteration in order to inspect a minimum number of subframes required in order to make any BLER determination. As shown, this minimum number is $N_{min}=100$, since at least 100 subframes must be inspected before making any corresponding BLER determination in the table. If the first iteration results in a tentative BLER determination of 0.5 or greater, the first radio node makes the first iteration's tentative BLER determination final. Otherwise, the first radio node performs one or more additional iterations. For example, if the first iteration's tentative BLER determination is 0.2, the first radio node inspects 50 more subframes in a second iteration, since the table specifies that at least 150 subframes must be inspected before making a BLER determination of 0.2. In doing so, the first radio node makes a second tentative BLER determination based on inspecting those 150 subframes. If the second tentative determination is greater than or equal to 0.2, then the first radio node makes that determination final. Otherwise, the first radio node performs a third iteration to inspect 125 more subframes, and so on. Note that, in this example, the number of additional subframes inspected in the next iteration varied from iteration to iteration (i.e., as defined by the rows of the table in FIG. 4, 50 additional for the $2^{nd}$ iteration, 125 additional for the $3^{rd}$ iteration, 1125 additional for the $4^{th}$ iteration, 1500 additional for the $5^{th}$ iteration, and 17000 additional for the $6^{th}$ iteration).

In other embodiments, the first radio node determines the minimum number $N_{min}$ of received data units that must be inspected as a basis for making a determination that data units are received erroneously at a particular rate, alternatively or additionally as a function of at least one other parameter (referred to as a first parameter K). In one embodiment, for example, the first radio node calculates the minimum number $N_{min}$ of received data units that must be inspected as a basis for making a determination that data units are received erroneously at a particular rate R, as:

$$N_{min} = \text{ceiling}(K/R), \quad (1)$$

where ceiling(x) equals the smallest integer number not less than x. Equivalently, this may be expressed as $N_{min}$=ceiling (N), with N=K/R being referred to as a second parameter. Of course, this ceiling operation may not be necessary if $N_{min}$ is determined in such a way that guarantees it will be an integer. If the ceiling operation is unnecessary, then $N_{min}$=N such that the second parameter N in some embodiments is itself regarded as the minimum number of data units which are used by the first radio node for determining the rate R.

In some embodiments, the first parameter K is rate-agnostic such that it has the same value for possible different rates R (e.g., packet error rates, PER). For example, the first parameter K may be a simple scalar value, which is applicable for all values of R. FIG. 5 illustrates an example of these embodiments in the form of a table that maps a scalar value K=10 to different minimum numbers $N_{min}$ for different possible predefined rates R according to $N_{min}$=ceiling (N), with N=K/R.

Specifically, the value of K=10 (scalar) applies for all possible 37 predefined rate R values (ranging from 0.01% to 100%). In at least some embodiments (as happens to be the case in FIG. 5's table), the value of K is set as the number of erroneous data units (e.g., 10) that the first radio node must receive to ensure a reliable maximum rate estimate of 100%. Regardless, no matter the particular approach for setting the value of K (scalar), the corresponding values of the second parameter N are rounded up by a ceiling function in terms of minimum number of data units that must be used by the first radio node for determining a certain reliable value of the error rate.

According to this example, the first radio node has to at least evaluate 10 data units (i.e. for maximum error rate=100%). If the error rate after evaluating those 10 data units is 100%, then the first radio node deems the error rate to be 100%, such as by reporting a 100% error rate to another node with ID=1. However, if the error rate after evaluating the 10 data units is below 100%, then the first radio node further evaluates up to 12 data units (i.e. 2 more) and if the error rate based on that evaluation is within 90% and 100%, then the first radio node determines the error rate to be 90% or 100%, whichever is closer. If the error rate is not within 90-100% then first radio node evaluates the error rate for up to the next level of data units (i.e., 14 data units), and so on.

In other embodiments, by contrast, the first parameter K is rate-specific such that it has different values for at least some different rates R (e.g., packet error rates, PER). For example, the first parameter K may be a vector quantity, with each element in K being applicable for one or more (but not all) possible values of R. For example, the first parameter K may be an m-dimensional vector quantity, K=(k1, k2, k3, . . . , km). In this case, each element, ki, in the n-dimensional vector is applicable for one of the possible values of R (e.g., pre-defined values of R). Or, the first parameter K may be an p-dimensional vector quantity, K=(k1, k2, k3, . . . , kp). In this case, each element, ki, in the p-dimensional vector is applicable for L possible values of R. Regardless, FIG. 6 illustrates an example of these embodiments in the form of a table that maps an m-dimensional vector quantity K to different minimum numbers $N_{min}$ for different possible predefined rates R according to $N_{min}$=ceiling (N), with N=K/R.

In more detail, the first parameter K in FIG. 6 is a vector ranging from 2 to 100 i.e. specific to each of the 37 possible values of the rate R. For each K value, the corresponding and potentially non-integer value of the second parameter N=K/R is shown in the second rightmost column in the table. The corresponding integer value of N for each R value is shown in the rightmost column of the table, as resulting from applying the ceiling function to the potentially non-integer value of N in the second rightmost column; that is, $N_{min}$=ceiling (N). One advantage of FIG. 6 (vectored K) is that $N_{min}$ can be controlled more easily; for example $N_{min}$ does not become excessively large for smaller values of R e.g. 1% or below.

Regardless, the value of the first parameter K may be a function of one or more criteria. One such criteria includes for instance the range of possible values for the error rate R. If the rate has a large range (i.e., dynamic range) from very low to very high values (e.g. 0.01% to 50%) then a smaller value of K (e.g. K≤10) may be configured. This is to avoid a very long delay in getting results for lower values of the error rate R. In yet another example, if the dynamic range is very large, then the first parameter K may be configured as an m-dimensional vector.

Alternative or additional criteria may include the level of reliability with which the error rate R must be determined. For example, if the determined error rate is required to have a very high reliability, then a larger values of K (e.g. K≥20) may be chosen.

Yet a further criteria include a rate at which the one or more second radio nodes transmit data units to the first radio node. For instance, if data units are transmitted by the second radio node more frequently (e.g. once every TTI or subframe) then the first parameter K can be set to a larger value (e.g. 20 or more). But otherwise if data units are transmitted occasionally (e.g. once every 10 frames) then a smaller value of K may be used to avoid delay in obtaining error rate results.

Still further, alternative or additional criteria may include the urgency or timeliness with which the error rate must be determined. If the obtained error rate results are used for real time applications (e.g. mobility decisions, adjustment of transport format, etc) then the first parameter K can be set to a smaller value (e.g. between 5 and 10) to ensure that error rate measurement results are obtained over a shorter time. But for background applications such as for network planning and parameter tuning (e.g. configuration of MBMS service areas) the first parameter K can be set to a larger value.

Regardless of the particular criteria used for determining the first parameter K, the first parameter may have one or more of the following properties: (i) an integer value or a floating point value; (ii) a unitless quantity; and (iii) a quantity which can be one of a scalar quantity, an m-dimensional vector quantity, a p-dimensional vector quantity, or a value or range between certain minimum (Kmin) and maximum (Kmax) value. More examples of the first parameter include: (i) an encoded value of $N_{min}$ (e.g., K is a predefined index for the configuration comprising $N_{min}$); (ii) a quality descriptor, e.g., the first parameter is a target quality metric such as a desired quality of service characteristic or a target error rate); (iii) a service type (which can then be mapped to $N_{min}$); and (iv) a target error rate (e.g., PER).

In at least some embodiments, the first parameter K represents the minimum number of erroneous data units (e.g., 10) necessary to ensure a reliable error rate estimate. In one or more other embodiments, the first parameter K is otherwise set to ensure that at least a minimum number of erroneous data units (e.g., 10) are received by the first radio node to obtain the error rate measurement.

Since $N_{min}$ is a function of K, this means that $N_{min}$ is indirectly a function of these one or more criteria as well. Of course, the first radio node may alternatively directly set the value of $N_{min}$ as a function of one or more of these criteria as well.

Of course, the above embodiments were merely exemplary. In still other embodiments, for example, the first radio node determines the minimum number $N_{min}$ of received data units that must be inspected as a basis for making a determination that data units are received erroneously at a particular rate, alternatively or additionally as a function of (i) an accuracy $R_{accuracy}$ or uncertainty with which the first radio node makes determinations of the rate at which data units are received erroneously; and/or (ii) a scaling or shaping parameter α for scaling or shaping an intermediate derivation of the minimum number. A few different examples of functions in this regard that depend on K, $R_{accuracy}$, and/or α include:

$$N = f(R, R_{accuracy}, K) \quad (2)$$

$$N = f(R, K) \quad (3)$$

$$N = f(R, K, \alpha) \quad (4)$$

$$N = K \quad (5)$$

Again $N_{min}$=ceiling(N), such that in these examples the minimum number $N_{min}$ is determined using at least the second parameter N, which in turn is derived from the first parameter K.

The rate R (e.g., PER) may be expressed as a percentage, ratio, or the like, and is any possible value that can be determined and/or reported by the first radio node. Typically the rate range, which is also called the reportable range, is predefined, e.g., 0.1% to 100%, for certain types of rate such as MCH PER.

The rate accuracy $R_{accuracy}$ is the accuracy with which the rate can be measured by the first radio node. The accuracy can be the same for all possible rate values R or it can be specific for each rate value R. The rate accuracy is also generally pre-defined as part of pre-defined performance requirements. In some examples, instead of rate accuracy, rate uncertainty may also be used.

Finally, the scaling or shaping parameter α is an additional parameter for scaling or shaping the derived value of the second parameter N. The parameter α can be pre-defined or configured by another node (e.g., the second radio node).

Of course, in the example relations (1)-(5), function f may also depend on other parameters than those explicitly shown in parentheses. Moreover, function f may depend on error rate explicitly or implicitly (i.e., directly or indirectly). For example, if parameter K indicates a service type which is associated with some pre-defined rate, then f depends on the rate implicitly (i.e., indirectly) in this example.

In general, therefore, embodiments exemplified by equations (1)-(5) suggest that the first radio node may use at least the first parameter K to determine a second parameter N by using an expression, wherein N and K may be the same or different. The expression therefore relates N and K. In a trivial case, N is the same as K. The expression may also be a function of pre-defined values of the error rate R (i.e. all possible R values which the first radio node can report or use for one or more tasks) or one or more parameters associated with the pre-defined values of R. The second parameter N may also be associated with each possible value of R or group of possible values of R. In another example, the expression is a mapping function which maps K to N, wherein the mapping may be based on a table, set of rules, computer code, logical expression, or arithmetical expression.

One or more expressions may be pre-defined, e.g., as in equations (1)-(5). In case of multiple pre-defined expressions, the first radio may use one of the pre-defined expressions for deriving the second parameter N based on autonomous selection.

In this and similar embodiments, therefore, the first radio node is configured to autonomously adapt the minimum number of data units that must be inspected across determinations of different error rates. For example, the first radio node may perform the above-described adapting by itself actually deriving or calculating the minimum number of received data units that must be inspected as the basis for making any given error rate determination. That is, the first radio node derives or calculates, for each possible error rate value, the minimum number of data units that must be inspected before determining that the error rate has that value (e.g., the first radio node obtains different values of the minimum number for different possible error rate values). Such may entail the first radio node retrieving the information directly from memory.

Figure 7:
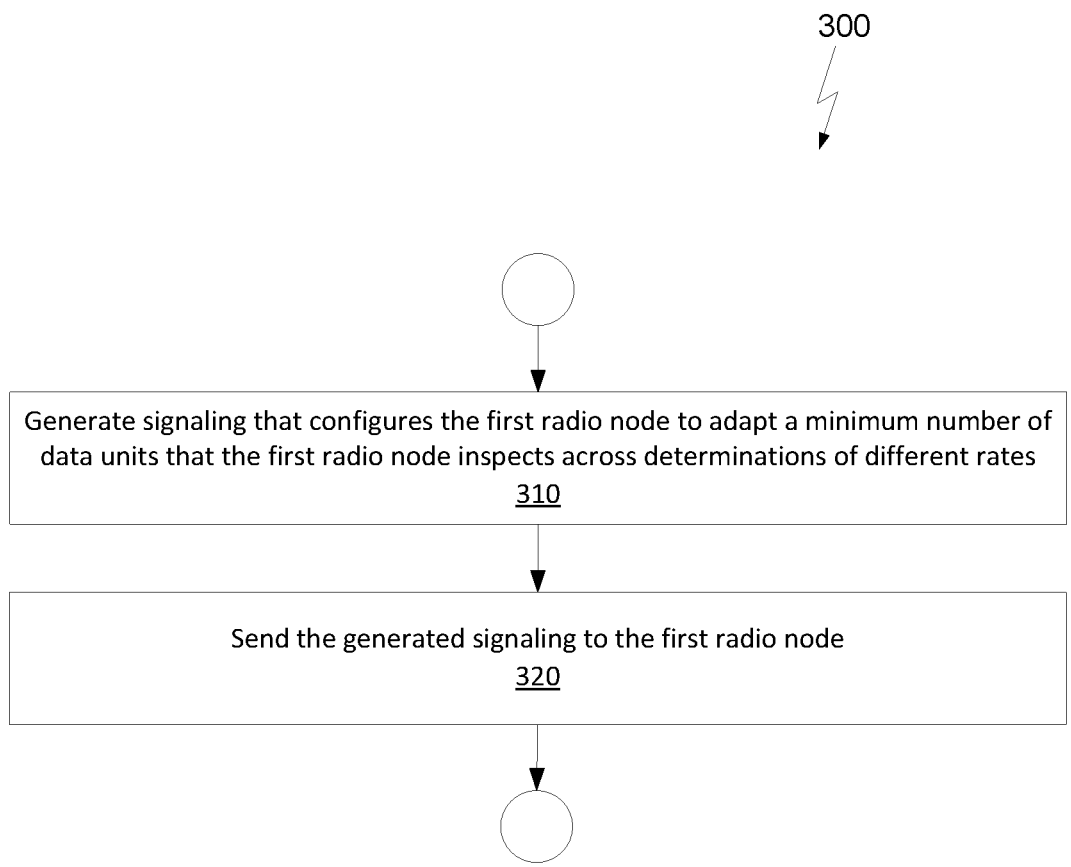
FIG. 7 is a logic flow diagram of a method implemented by a node for configuring a first radio node to make successive determinations of a rate at which units of data are received erroneously from one or more second radio nodes, according to one or more embodiments.

In other embodiments, though, the first radio node is configured to perform that adaptation based at least in part on signaling from another node (e.g., the second radio node or some other node referred to as a third node). FIG. 7 illustrates a method performed by such a signaling node in this case.

In particular, FIG. 7 illustrates a method 300 implemented by a node for configuring the first radio node to make successive determinations of a rate at which units of data are received erroneously from one or more second radio nodes. The method 300 includes generating signaling that configures the first radio node to adapt a minimum number of data units that the first radio node must inspect across determinations of different rates, such that determinations of different rates must be respectively based on inspecting different minimum numbers of received data units for errors (Block 310). The method also entails sending the generated signaling to the first radio node (Block 320).

In at least some embodiments, for example, the signaling indicates different minimum numbers $N_{min}$ of received data units that the first radio node must inspect as a basis for making determinations of different rates R at which data units are received erroneously. The signaling may explicitly indicate, for example, a mapping between different rates and different minimum numbers of received data units, e.g., as an indexed look-up table similar to that in FIGS. 4-6.

In other embodiments, though, the signaling identifies which of multiple possible functions (e.g., functions (1)-(5) above) the first radio node is to use to determine the minimum number of received data units that must be inspected as a basis for making a determination that data units are received erroneously at a particular rate. The signaling in this case may therefore simply be an index associated with a certain one of multiple different predefined functions that are possible for using to perform the above-described adaptation.

In still other embodiments, the signaling comprises the first parameter K and/or the second parameter N. In any of these embodiments, the signaling node may determine K, N, or $N_{min}$ in the same way as described above for the first radio node, e.g., using functions (1)-(5).

The signaling node may also configure the first radio node to perform error rate determining for one or more channels (e.g. MCH, PDSH, PBCH etc) based on data units that are expected to be received from the one or more second radio nodes. The first parameter (K) may be sent to the first radio node also as part of MDT configuration i.e. for determining, logging and reporting the error rate based on the first parameter.

Any of the above described nodes may use the determined error rate for one or more radio operations or radio resource management (RRM) tasks. Such tasks include for example storing the determined error rate (or range or particular values of error rate) in its memory and using it at a future time. Other tasks include adjusting or adapting one or more of a node's receiver parameters. For example, if error rate is larger than a threshold, then the node may use a receiver which can receive signals even at much lower value of signal quality (e.g. at SNR or SINR below −3 dB). In another example, if error rate is larger than a threshold, then the node may use a receiver which can partially or fully mitigate the interference received from one or more interfering cells.

Still other such tasks include transmitting (i.e., reporting) the determined error rate results to another node. Examples of other nodes are the second radio node, third node or even a fourth node. The fourth node may be a UE or a network node such as base station or core network node. The fourth node receiving the error rate results may even forward the results to another node (e.g. MCE in MBMS). In one example, the third node and the fourth node may be the same e.g. same node configured the first radio node and also receives the error rate results from the first radio node. In another example, the second radio node, third node and the fourth node may be the same e.g. all are base station.

Yet other tasks include adapting transmission configuration, e.g., transport format, transmit power, bandwidth, redundancy level (e.g., number of transmitted redundancy versions or retransmissions, coding rate, etc.), MSC, or link adaptation configuration: For example if the error rate is higher (e.g. 10% or more), the first radio node may recommend the fourth node that the second radio node uses more robust transport format (e.g. lower code rate such as ½ and lower order modulation such as QPSK) for transmitting packets.

Additional or alternative tasks include configuring the error correction mechanism (e.g., a more advanced error correction scheme may be employed when PER is high) and/or configuring feedback (e.g., feedback may be needed when the error probability is high, otherwise no feedback may be used to reduce signaling overhead).

Similarly, in one embodiment, the determined second parameter may be further signaled to another node. In one example, the second parameter is signaled to another node together with a measurement report. In another example, the second parameter is signaled to another node without the measurement report.

In view of the above variations and modifications, those skilled in the art will appreciate that the first parameter may be obtained using one or more of the following techniques. In a first technique, the first parameter is a predefined value. In this case, the value can be predefined in the standard. The same or different values can be predefined for different types and/or ranges of error rate. In a second technique, the first parameter is autonomously determined by the first radio node. In this case the first radio node itself selects the value of the first parameter. The selection can be based on one or more criteria e.g. based on previously estimated error rate or expected error rate. For example a larger value for low error rate (e.g. below 10%) and smaller value for higher error rate (e.g. equal or above 10%).

In a third technique, the first parameter is received from a second or third radio node. That is, the second radio node which transmits packets may also signal the value of the first parameter to the first radio node, or a separate node (other than the one transmitting packets) configures the first radio node with the value of the first parameter.

Those skilled in the art will further appreciate that embodiments herein generally include a method in a first radio node as follows. A first radio node (e.g. UE or eNode B) is configured to determine packet error rate (PER) (or simply 'error rate") based on packets received from a second radio node (e.g. UE or eNode B) using at least a certain number (N) of the received packet entities (e.g. packets) and use the determined PER for one or more operations. In this case, N is derived by the first radio node based on an expression which is a function of a first parameter (K). And the parameter (K) obtained by the first radio node is: a pre-defined value, autonomously determined by the first radio node or received from the second radio node or from another node (e.g. third node). If the function does not simply define N to be the same as the first parameter (K), N is derived in some embodiments based on an expression which is also a function of pre-defined value(s) of PER. The method in the first radio node in some embodiments may therefore mainly consist of obtaining the first parameter, determining the second parameter, determining the error rate, and using the determined error rate for radio operations.

According to some embodiments, a method in a third node is as follows. A third node (e.g. eNode B) determines a value of a first parameter (K) based on one or more criteria. In this case, K is used by a first radio node for determining a second parameter (N), wherein N is the minimum number of packets used by the first radio node for determining PER (or simply 'error rate") based on packets received from a second radio node. Regardless, the third node also configures the first radio node with the determined first parameter (K).

In at least some embodiments, K is used by the first radio node for determining the second parameter (N) as a function of pre-defined value(s) of packet error rate (PER).

One or more embodiments herein enable a radio node to measure and report packet error rate (PER) based on packets received from another radio node in a reliable manner regardless of the range of the possible values of PER (i.e. from minimum to maximum possible reportable values of PER).

One or more methods herein enable the UE to determine PER (e.g. BLER) which may have wide range of values or dynamic range e.g. ranging between 0.1% to 100%. The methods provide systematic mechanism to estimate PER regardless of the PER value. The methods ensure that the determined PER is reliable regardless of the PER value. Due to high reliability the determined PER can be used for a variety of functions in the network e.g. network planning, tuning of radio transmission and/or reception parameters etc. The MCH BLER based on the disclosed methods can be reliably used for configuring MBMS service areas. This in turn will enhance the reception performance of the MBMS service.

In at least some embodiments, a packet error rate is determined as a ratio of the number of correctly received packets to the total number of received packets. The ratio can also be transformed into another scale by the first radio node depending upon the use case. For example the PER can be expressed in linear scale such as a ratio or percentage or in non-linear scale (e.g. log scale). For reporting the PER may be expressed in log scale to reduce signaling overheads.

The first radio node may also be configured to determine the packet error rate (PER) on the packets received from a plurality of other radio nodes. For example in MBMS operation the first radio node can be a UE which receives MCH packets transmitted by one or more eNode Bs in a MBMS service area during MBMS subframes. The second radio in this example is therefore an eNode B. The first and second radio nodes can also be a radio network node (e.g. eNode B) and UE respectively; in this case the radio network node determines the PER on the packets transmitted by the UE.

In one example, the transmissions from multiple radio nodes may also be combined at the receiving UE before determining PER based on the transmissions. For example, the same data transmissions may be transmitted from different eNodeBs of the same MBSFN area for the same service; these transmissions may be combined by the UE which then determine PER based on the combined transmission. Another example is when the UE is determining PER in a CoMP deployment.

The first radio node can be configured autonomously (i.e. by itself) or by another node for determining the PER on packets transmitted by the second radio node. Examples of other configuring nodes are second radio node or a third node. The third node can be a radio node (e.g. base station, eNode B etc) or it can also be any kind of network node (e.g. MME, MDT etc), which can communicate with the first radio node. In some embodiments the second radio node and the third node may be the same e.g. eNode B. The first radio node may also be configured to measure PER jointly or separately for packets related to plurality of channels (e.g. MTCH, MCCH, PDSCH etc) from the same or different radio nodes. The first radio node after determining the PER may use it for one or more radio operational tasks (as described in the next section).

The packet can be transmitted on any channel including control, data, broadcast or multicast channel. Examples of channel are Physical Downlink Shared Channel (PDSCH), Physical Uplink Shared Channel (PUSCH), Paging Channel (PCH), Physical Downlink Control Channel (PDCCH), Broadcast Channel (BCH), MCH, MTCH, MCCH etc.

A generic term 'determining' or 'determination of' PER is used in the embodiments. The determination of the PER can be based on a measurement or on an estimation that whether a particular packet is received correctly or incorrectly at the first radio node from the second radio node. The determination may also be calculation in some examples. An error in the reception of a packet is determined over a certain time duration e.g. an interleaving time aka TTI, which is 1 subframe in LTE. Typically a CRC is appended to each packet transmitted by the second radio node. Therefore whether the packet is correctly decoded or not is determined by the first radio node based on the CRC of that packet.

In some embodiments a non-limiting term UE is used. The UE herein can be any type of wireless device capable of communicating with network node or another UE over radio signals. The UE may also be a radio communication device, target device, device to device (D2D) UE, machine type UE or UE capable of machine to machine communication (M2M), a sensor equipped with UE, iPAD, Tablet, mobile terminals, smart phone, laptop embedded equipped (LEE), laptop mounted equipment (LME), USB dongles, Customer Premises Equipment (CPE) etc.

Also in some embodiments generic terminology, "radio network node" or simply "network node (NW node)", is used. It can be any kind of network node which may comprise of base station, radio base station, base transceiver station, base station controller, network controller, evolved Node B (eNB), Node B, Multi-cell/multicast Coordination Entity (MCE), relay node, access point, radio access point, Remote Radio Unit (RRU) Remote Radio Head (RRH), or even core network node, etc.

The term 'radio node' used herein may be used to denote a UE or a radio network node.

The embodiments are applicable to single carrier as well as to multicarrier or carrier aggregation (CA) operation of the UE in which the UE is able to receive and/or transmit data to more than one serving cell. The term carrier aggregation (CA) is also called (e.g. interchangeably called) "multi-carrier system", "multi-cell operation", "multi-carrier operation", "multi-carrier" transmission and/or reception. In CA one of the component carriers (CCs) is the primary component carrier (PCC) or simply primary carrier or even anchor carrier. The remaining ones are called secondary component carrier (SCC) or simply secondary carriers or even supplementary carriers. The serving cell is interchangeably called as primary cell (PCell) or primary serving cell (PSC). Similarly the secondary serving cell is interchangeably called as secondary cell (SCell) or secondary serving cell (SSC).

The embodiments are described for MBMS transmission LTE. However the embodiments are applicable to any service type (unicast, multicast, or broadcast) and any RAT or multi-RAT systems, where the UE receives and/or transmit signals (e.g. data) e.g. LTE FDD/TDD, WCDMA/HSPA, GSM/GERAN, Wi Fi, WLAN, CDMA2000 etc.

In some embodiments the term subframe, MBMS subframe or MBSFN subframe are interchangeably used but they all bear the same meaning. However the embodiments are not limited to MBMS on subframe level rather they apply to any duration or time period over which MBMS (or other radio transmission type for which the embodiments apply) can be transmitted in the current or in future communication system e.g. frame, time slot, symbols etc. Furthermore, the embodiments are not limited to MBMS particularly but may be applied in a similar way to any unicast/multicast/broadcast type of transmissions or service.

Figure 8:
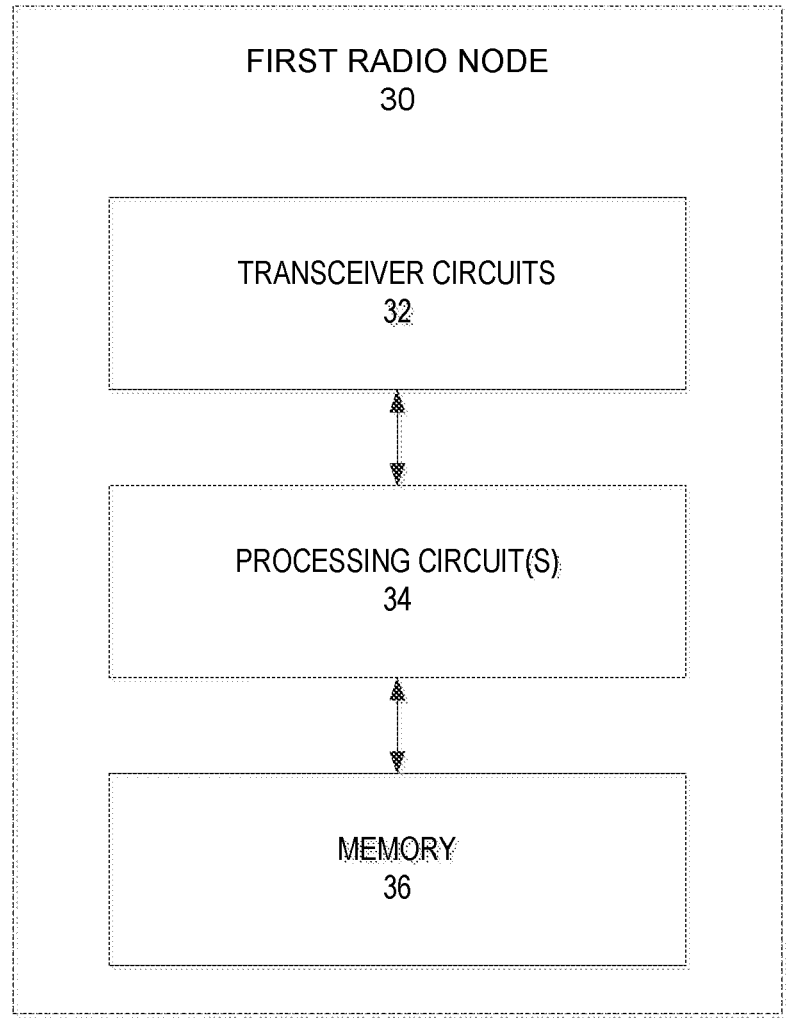
FIG. 8 is a block diagram of a first radio node according to one or more embodiments.

In view of the above modifications and variations, those skilled in the art will appreciate that FIG. 8 illustrates an example first radio node 30 configured according to one or more embodiments herein. The first radio node 30 comprises transceiver circuits 32 for communicating over an air interface with a second radio node in a wireless communication network, processing circuits 34 for performing processing described herein, and memory 36 for storing program code and data needed for operation. The transceiver circuits 32 may, for example, comprise transmitter circuits and receiver circuits that operate according to the LTE-Release 12 standard or other known standard. The processing circuits 34 may comprise one or more processors, hardware circuits, firmware, or a combination thereof. Memory 36 may comprise one or more volatile and/or non-volatile memory devices. Program code for controlling operation of the first radio node 30 is stored in a non-volatile memory, such as a read-only memory or flash memory. Temporary data generated during operation may be stored in random access memory. The program code stored in memory, when executed by the processing circuit, causes the processing circuit to perform the methods shown above.

Figure 9:
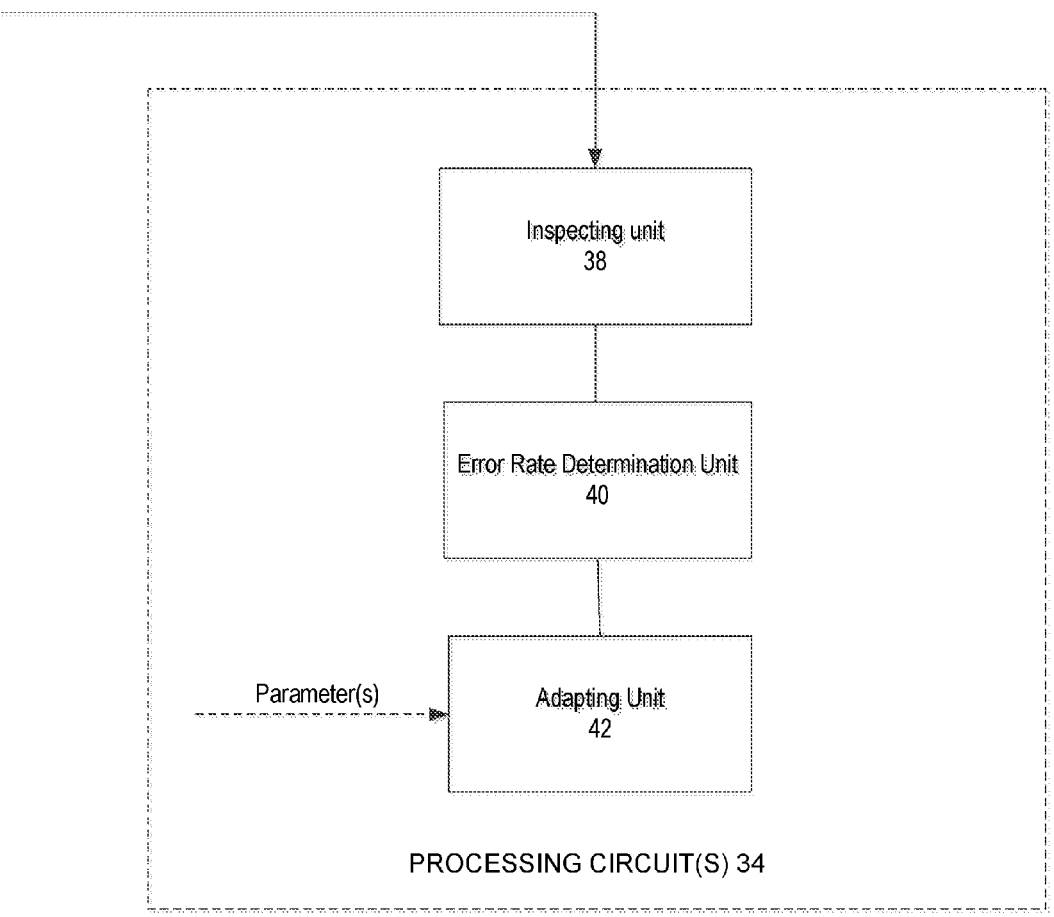
FIG. 9 is a block diagram of functional units of a first radio node according to one or more embodiments.

FIG. 9 illustrates the main functional components of the processing circuit(s) 34 according to one exemplary embodiment. The functional components include an inspecting unit 38, an error rate determination unit 40, and an adapting unit 42. In one embodiment, these units each comprise a programmable circuit that is configured by program code stored in memory to perform their respective functions. In other embodiments, one or more of the functional components may be implemented, in whole or in part, by hardware circuits. Regardless, the inspecting unit 38 is configured to inspect data units received from the second radio node for errors. The error rate determination unit 40 is configured to make successive determinations of the rate at which data units are received erroneously from the second radio node. And the adapting unit 42 is configured to adapt the minimum number of data units that must be inspected across determinations of different rates, as described above. In at least some embodiments, the adapting unit 42 does so based on one or more parameters (e.g., N and/or K) obtained from other components of the first radio node 30 (not shown) or received from a third node.

Figure 10:
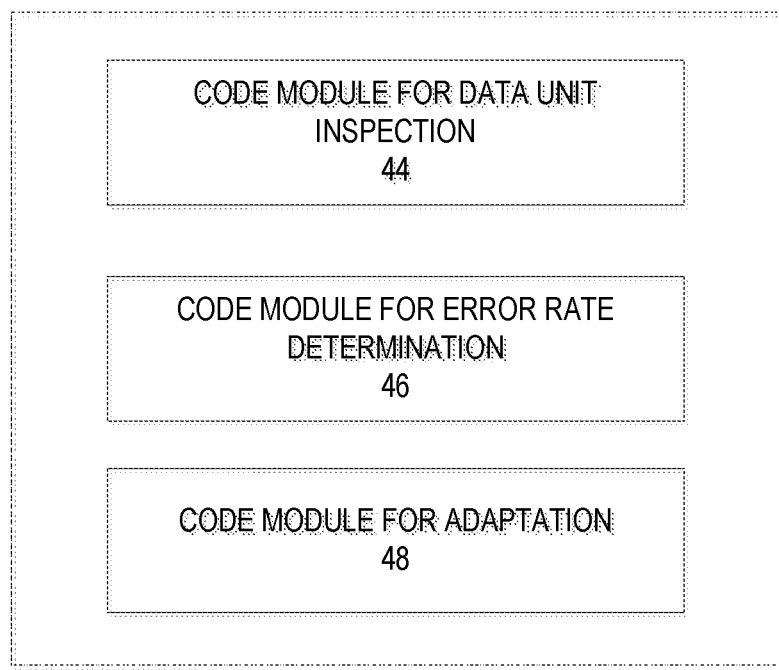
FIG. 10 is a block diagram of code modules of a first radio node according to one or more embodiments.

FIG. 10 illustrates a non-transitory computer readable medium, e.g., memory of the first radio node 30, with stored program code according to one exemplary embodiment. The memory stores a code module 44 for data unit inspection, a code module 46 for error rate determination, and a code module 48 for the above-described adaptation.

Figure 11:
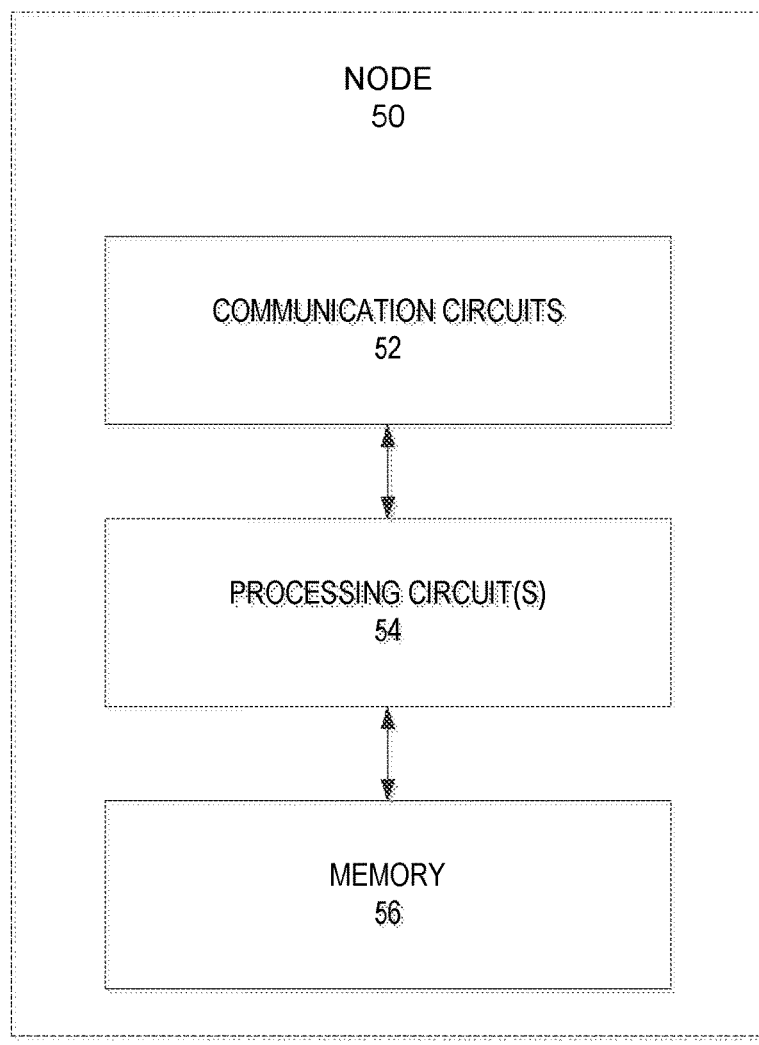
FIG. 11 is a block diagram of a node according to one or more embodiments.

Also in view of the above modifications and variations, those skilled in the art will appreciate that FIG. 11 illustrates an example node 50 configured according to one or more embodiments herein. The node 50 comprises communication circuits 52 for directly or indirectly communicating with the first radio node 30, processing circuits 54 for performing processing described herein, and memory 56 for storing program code and data needed for operation. The processing circuits 54 may comprise one or more processors, hardware circuits, firmware, or a combination thereof. Memory 58 may comprise one or more volatile and/or non-volatile memory devices. Program code for controlling operation of the node 50 is stored in a non-volatile memory, such as a read-only memory or flash memory. Temporary data generated during operation may be stored in random access memory. The program code stored in memory, when executed by the processing circuit, causes the processing circuit 54 to perform the methods shown above.

Figure 12:
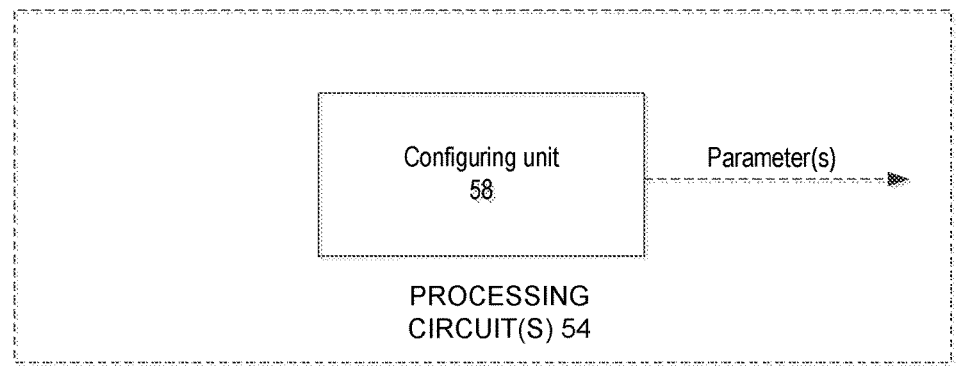
FIG. 12 is a block diagram of functional units of a node according to one or more embodiments.

FIG. 12 illustrates the main functional components of the processing circuit(s) 54 according to one exemplary embodiment. The functional components include a configuring unit 58. In one embodiment, this unit 58 comprises a programmable circuit that is configured by program code stored in memory to perform their respective functions. In other embodiments, one or more of the functional components may be implemented, in whole or in part, by hardware circuits. Regardless, the configuring unit 58 configures the first radio node 30 to adapt the minimum number of data units that it inspects across determinations of different rates, by generating and sending signaling to the first radio node 30 (via the communication circuits), e.g., signaling that indicates one or more parameters defining (or otherwise governing) that adaptation.

Figure 13:
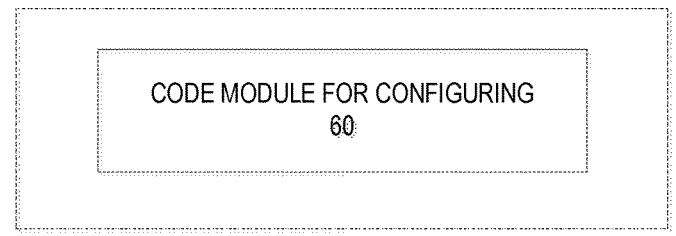
FIG. 13 is a block diagram of code modules of a node according to one or more embodiments.

FIG. 13 illustrates a non-transitory computer readable medium, e.g., memory of the third node, with stored program code according to one exemplary embodiment. The memory stores a code module 60 for the above-described configuring.

One or more other embodiments are enumerated below. A method implemented in the network node and UE is captured in the following embodiments.

1. A method in a first radio node configured to determine packet error rate (PER) based on packets received from a second radio node, the method comprising:
   a. Obtaining at least a first parameter (K);
   b. Determining a second parameter (N) based on a function f(.), which comprises of at least a pre-determined PER value and the first parameter, and wherein N is the minimum number of packet entities which are to be used by the first radio node for determining the PER;
   c. Determining the PER based on the determined second parameter; and
   d. Using the determined PER for one or more radio operational tasks.
2. The method according to embodiment 1, wherein the first parameter and the second parameter are the same.
3. The method according to embodiment 1, wherein the second parameter is signaled to another node.
4. The method according to embodiment 1, wherein the packet entity is expressed as the packet received by the first radio node.
5. The method according to embodiment 1, wherein the packet entity is expressed as the time duration, or the interleaving time or TTI over which at least one packet can be received by the first radio node.
6. The method according to embodiment 1, further comprising obtaining the at least first parameter based on one or more of the following:
   a. a pre-defined value;
   b. autonomous determination by the first radio node;
   c. an information received from a second radio node;
   d. an information received from a third node
7. The method according to embodiment 1, wherein the first parameter is a scalar quantity, which is applicable for all values of PER.
8. The method according to embodiment 1, wherein the first parameter is m-dimensional vector quantity. $K=(k_1, k_2, k_3 \ldots k_m)$ and wherein each element. $k_i$ in the vector is applicable for one of the possible PER values.
9. The method according to embodiment 1, wherein the parameter N is determined by using any of the following functions:
   a. N=f(PER. PER accuracy. K)
   b. N=f(PER. K)
   c. N=K/reportable PER
10. The method according to embodiment 1, wherein radio operation tasks comprise one or more of the following:
    a. Storing the PER in the memory;
    b. Using the PER for adapting one or more parameters related to radio receiver in the first radio node;
    c. Reporting PER results to the second radio node and/or to the third node and/or to a fourth node.
11. The method according to any of the preceding embodiments 1-10, wherein the first radio node is a UE.
12. The method according to any of the preceding embodiments 1-10, wherein the second radio node is a UE.
13. The method according to any of the preceding embodiments 1-10, wherein the first radio node is a network node.
14. The method according to any of the preceding embodiments 1-10, wherein the third node is a network node.
15. The method according to any of the preceding embodiments 1-10, wherein the third node is a UE.
16. The method according to any of the preceding embodiments 1-10, wherein the fourth node is a network node.
17. The method according to any of the preceding embodiments 1-16, wherein the second. third and fourth nodes are the same.
18. The method according to the preceding embodiment 17, wherein the second. third and fourth nodes are eNode B.

19. The method according to any of the preceding embodiments 1-18, wherein PER is determined by the first radio node based on cyclic redundancy check (CRC) attached to the received packet.

20. The method according to any of the preceding embodiments 1-19, wherein
   a. packet is any of: data block, transport block, frame, radio frame, and interleaved data block
   b. PER is any of: BLER, MCH BLER, and FER 21. A method in a third node configuring a first radio node for determining a PER based on packets received from a second radio node. the method comprising:
   a. Determining at least a first parameter (K), which is to be used by the UE for determining a second parameter (N) based on a function. f(.), which function comprises of at least a PER and the first parameter, and wherein N is the minimum number of packet entities which are to be used by the first radio node for determining the PER;
   b. Transmitting the determined at least first parameter (K) to the first radio node;

22. The method according to embodiment 21, wherein the packet entity is expressed as the packet received by the first radio node.

23. The method according to embodiment 22, wherein the packet entity is expressed as the interleaving time or TTI over which at least one packet can be received by the first radio node.

24. The method according to embodiment 23, wherein the first parameter is a scalar quantity. which is applicable for all values of PER.

25. The method according to embodiment 21, wherein the first parameter is n-dimensional vector quantity. $K=(k_1, k_2, k_3 \ldots k_m)$ and wherein each element. $k_i$. in the vector is applicable for one of the possible PER values.

26. The method according to embodiment 21, wherein the parameter N is determined by using any of the following functions:
   a. N=f(reportable PER. PER accuracy, K)
   b. N=f(reportable PER, K)
   c. N=K/PER 27. The method according to any of the preceding embodiments 21-26, wherein the third node is the second radio node.

28. The method according to any of the preceding embodiments 21-27, wherein the third node is a network node.

29. The method according to the preceding embodiments 28, wherein the network node is eNode B.

30. The method according to any of the preceding embodiments 1-29, wherein
   a. packet is any of: data block, transport block, frame, radio frame, and interleaved data block
   b. PER is any of: BLER, MCH BLER and FER

What is claimed is:

1. A method, implemented by a first radio node, the method comprising:
   inspecting data units received over a radio channel from the one or more second radio nodes for errors;
   making successive determinations of the rate at which data units are received erroneously from the one or more second radio nodes, wherein each determination must be made based on inspecting at least a minimum number of received data units for errors;
   adapting the minimum number of data units that must be inspected across determinations of different rates, such that determinations of different rates must be respectively made based on inspecting different minimum numbers of received data units for errors;
   determining the minimum number of received data units that must be inspected as a basis for making a determination that data units are received erroneously at a particular rate, as a function of at least a first parameter, wherein determining the minimum number comprises calculating a second parameter as being the first parameter divided by the particular rate, and calculating the minimum number as being the smallest integer number not less than the second parameter; and
   when the first radio node makes the determination, using the determined minimum number of received data units, that data units are received erroneously at the particular rate, adapting one or more parameters that govern reception of data units over the radio channel by the first radio node, or that govern transmission of data units over the radio channel by the second radio node, 2. The method of claim 1, wherein making any given one of the determinations comprises, for each of one or more iterations:
   making a tentative determination of the rate based on inspecting a provisional number of received data units for errors;
   identifying a minimum number of received data units that must be inspected in order to make the tentative determination final, based on a function which defines, for each of multiple different possible rates, a minimum number of received data units that must be inspected in order to make a determination of that rate final;
   if the provisional number is greater than or equal to the identified number, designating the tentative determination as final; and
   if the provisional number is less than the identified number, inspecting additional received data units for errors as a basis for making another tentative determination in another iteration.

3. The method of claim 1, further comprising determining the minimum number of received data units that must be inspected as a basis for making a determination that data units are received erroneously at a particular rate, as a function of at least one or more of:
   an accuracy or uncertainty with which the first radio node makes determinations of the rate at which data units are received erroneously; and a scaling or shaping parameter for scaling or shaping an intermediate derivation of the minimum number.

4. The method of claim 1, wherein determinations of relatively smaller rates must be respectively made based on inspecting relatively greater numbers of received data units for errors.

5. The method of claim 1, wherein the determinations comprise selections from a set of predefined rates, and wherein selections of different predefined rates must be made based on inspecting different minimum numbers of received data units for errors.

6. The method of claim 1, further comprising determining the minimum number of received data units that must be inspected as a basis for making a determination that data units are received erroneously at a particular rate, as a function of at least that particular rate and/or a type of service associated with that particular rate.

7. The method of claim 1, wherein the adapting one or more parameters comprises:
   configuring a transport format to be used by the second radio node for transmitting data units to the first radio node;

configuring whether or not the first radio node provides feedback to the second radio node; and configuring a scheme with which the first radio node detects and/or corrects errors in received data units.

8. The method of claim 1,
wherein the first radio node is a user equipment, the data units are Multicast Channel (MCH) transport blocks that contain MCH data for a Multimedia Broadcast Multicast Service (MBMS); and
wherein the rate is a block error rate.

9. The method of claim 8, further comprising configuring MBMS service areas and/or tuning MBMS-related transmission or reception parameters based on the determinations.

10. the method of claim 8, wherein the method comprises reporting one or more of the error rate determinations to a Multi-cell/multicast Coordination Entity (MCE) in the MBMS.

11. The method of claim 1, further comprising receiving signaling from a signaling node that configures the first radio node to adapt the minimum number of data units that the first radio node must inspect across determinations of different rates.

12. The method of claim 11, wherein the received signaling indicates different minimum numbers of received data units that the first radio node must inspect as a basis for making determinations of different rates at which data units are received erroneously.

13. The method of claim 11, wherein the received signaling indicates the first parameter is rate-agnostic such that the first parameter has the same value for the different rates.

14. The method of claim 11, wherein the received signaling indicates the first parameter is rate-specific such the first parameter has different values for at least some different rates.

15. The method of claim 11, wherein the received signaling indicates the first parameter is a function of one or more of:
   a range of possible values for the rate;
   a level of reliability with which the rate must be determined;
   a rate at which the one or more second radio nodes transmit data units to the first radio node; and
   a level of urgency for determinations of the rate.

16. A first radio node configured to determine a rate at which units of data are received erroneously from one or more second radio nodes, the first radio node comprising:
   one or more processing circuits;
   memory containing instructions executable by the one or more processing circuits whereby the first radio node is configured to:
   inspect data units received from the one or more second radio nodes for errors;
   make successive determinations of the rate at which data units are received erroneously from the one or more second radio nodes, wherein each determination must be made based on inspecting at least a minimum number of received data units for errors;
   adapt the minimum number of data units that must be inspected across determinations of different rates, such that determinations of different rates must be respectively made based on inspecting different minimum numbers of received data units for errors;
   determine the minimum number of received data units that must be inspected as a basis for making a determination that data units are received erroneously at a particular rate, as a function of at least a first parameter, wherein the first radio node is configured to determine the minimum number by calculating a second parameter as being the first parameter divided by the particular rate, and to calculate the minimum number as being the smallest integer number not less than the second parameter; and
   when the first radio node makes the determination, using the determined minimum number of received data units, that data units are received erroneously at the particular rate, adapt one or more parameters that govern reception of data units over the radio channel by the first radio node, or that govern transmission of data units over the radio channel by the second radio node.

17. A non-transitory computer readable medium for controlling
   determining, by a first radio node, a rate at which units of data are received erroneously from one or more second radio nodes, the non-transitory computer readable medium having stored thereon software instructions which, when run on one or more processing circuits of the first radio node, causes the first radio node to:
   inspect data units received from the one or more second radio nodes for errors;
   make successive determinations of the rate at which data units are received erroneously from the one or more second radio nodes, wherein each determination must be made based on inspecting at least a minimum number of received data units for errors;
   adapt the minimum number of data units that must be inspected across determinations of different rates, such that determinations of different rates must be respectively made based on inspecting different minimum numbers of received data units for errors;
   determine the minimum number of received data units that must be inspected as a basis for making a determination that data units are received erroneously at a particular rate, as a function of at least a first parameter, wherein the first radio node is configured to determine the minimum number by calculating a second parameter as being the first parameter divided by the particular rate, and to calculate the minimum number as being the smallest integer number not less than the second parameter when the first radio node makes the determination, using the determined minimum number of received data units, that data units are received erroneously at the particular rate, adapt one or more parameters that govern reception of data units over the radio channel by the first radio node, or that govern transmission of data units over the radio channel by the second radio node.

* * * * *